United States Patent
Nicholson

(10) Patent No.: US 10,131,500 B2
(45) Date of Patent: Nov. 20, 2018

(54) CABLE CONVEYOR DISC

(71) Applicant: Intraco, Inc., Oskaloosa, IA (US)

(72) Inventor: Eric L. Nicholson, Oskaloosa, IA (US)

(*) Notice: Subject to any disclaimer, the term of this patent is extended or adjusted under 35 U.S.C. 154(b) by 0 days.

(21) Appl. No.: 15/679,747

(22) Filed: Aug. 17, 2017

(65) Prior Publication Data
US 2018/0057267 A1    Mar. 1, 2018

Related U.S. Application Data

(60) Provisional application No. 62/380,611, filed on Aug. 29, 2016.

(51) Int. Cl.
| | | |
|---|---|---|
| *B65G 19/14* | (2006.01) | |
| *C08L 23/06* | (2006.01) | |
| *C08L 23/08* | (2006.01) | |

(52) U.S. Cl.
CPC ............. *B65G 19/14* (2013.01); *C08L 23/06* (2013.01); *C08L 23/08* (2013.01); *C08L 2207/066* (2013.01); *C08L 2207/068* (2013.01)

(58) Field of Classification Search
CPC ......... B65G 19/14; B65G 19/22; C08L 23/06; C08L 2207/068
USPC .................. 198/725, 727, 728, 733
See application file for complete search history.

(56) References Cited

U.S. PATENT DOCUMENTS

| | | | | |
|---|---|---|---|---|
| 2,756,866 A | * | 7/1956 | Wilde, Jr. ............. | B65G 19/14 198/629 |
| 3,586,155 A | * | 6/1971 | Turrentine ............ | B65G 19/14 119/901 |
| 3,905,473 A | | 9/1975 | Jones | |
| 4,071,136 A | | 1/1978 | Jones | |
| 4,395,973 A | | 8/1983 | Hall | |
| 6,267,227 B1 | * | 7/2001 | McGoun ................ | B65G 47/78 198/359 |
| 6,709,399 B1 | * | 3/2004 | Shen .................... | A61B 5/0006 128/923 |
| 6,946,521 B2 | * | 9/2005 | Miserque .............. | C08F 210/16 525/191 |
| 7,127,853 B2 | * | 10/2006 | Miserque .............. | C08F 210/16 52/191 |
| 7,267,218 B1 | | 9/2007 | Van Zee | |
| 9,828,703 B2 | * | 11/2017 | Witting ..................... | D02J 3/00 |

* cited by examiner

*Primary Examiner* — Leslie A Nicholson, III
(74) *Attorney, Agent, or Firm* — Sturm & Fix LLP

(57) ABSTRACT

A disc for a cable conveyor comprised of a polymer formed from a resin including a blend of siloxane, and polyethylene. The siloxane may be a high molecular weight siloxane having a viscosity ranging from 10,000 cst. to 1,000,000 cst., preferably about 500,000 cst., and the polyethylene may be an ultra-high molecular weight polyethylene having a molecular weight ranging from 3 million grams/mol. to 8 million grams/mol., preferably about 3.5 million grams/mol. The siloxane is present in the blend from 0.5 percent to 30.0, preferably about 3.0 percent.

6 Claims, 3 Drawing Sheets

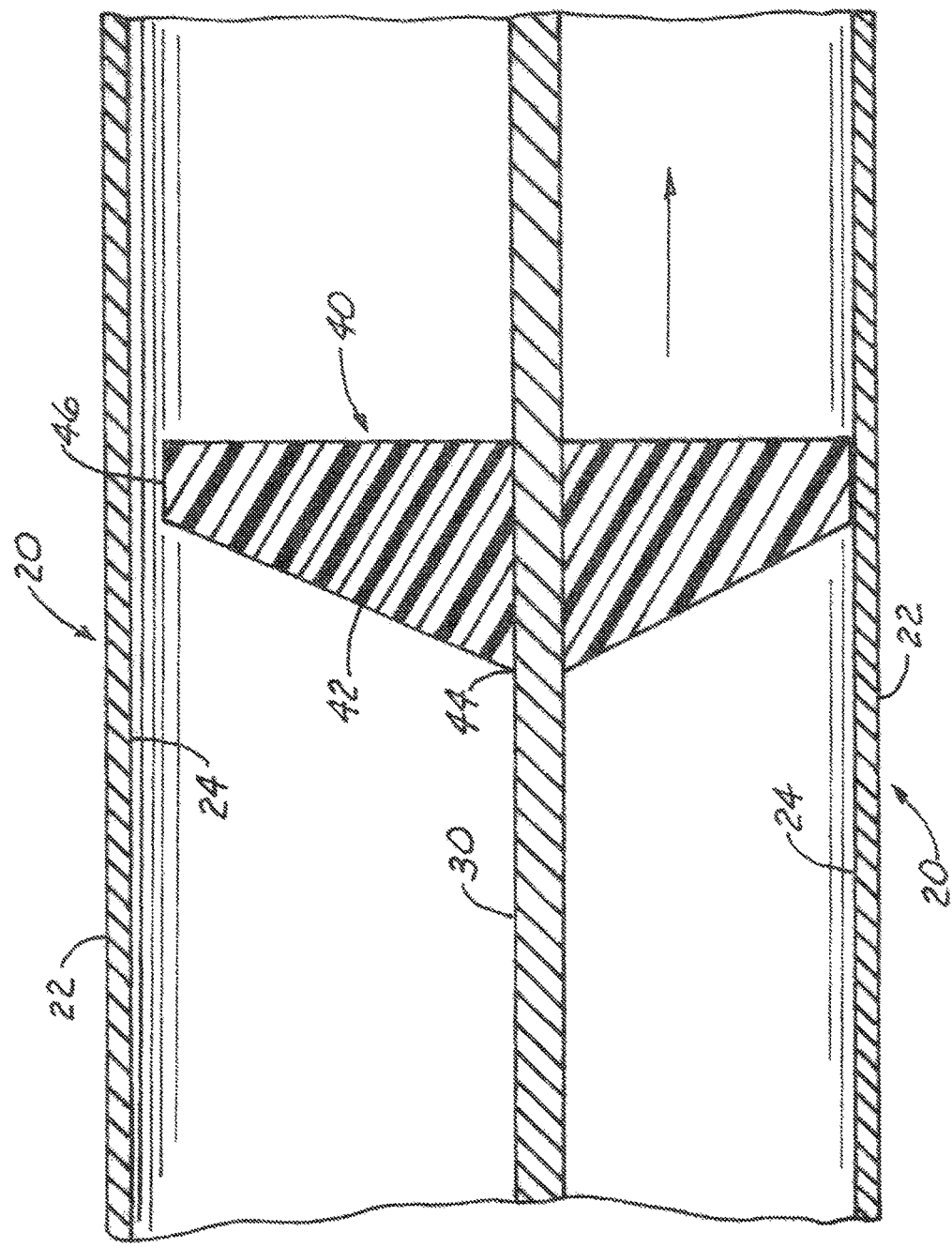

CABLE CONVEYOR DISC

CROSS-REFERENCE TO RELATED APPLICATIONS

This application claims priority from U.S. Provisional Patent Application, Ser. No. 62/380,611 filed Aug. 29, 2016, entitled Cable Conveyor Disc, which is incorporated herein by reference in its entirety.

BACKGROUND OF THE INVENTION

Field of the Invention

The present invention relates to the field of cable conveyors, and more particularly to the discs that are attached to the cable travelling through a tubular circuit.

Description of the Related Art

As can be seen by reference to the following U.S. Pat. Nos. 3,905,473, 4,071,136, 4,395,973 and 7,267,218, (all hereby incorporated herein by reference in their entirety), the prior art is replete with myriad and diverse cable conveyor systems.

Cable conveyor systems have long been in use to transport materials from a charging location to discharging locations along the path of the conveyor. Discs attached at intervals to the cable, or other flexible member, travel within the tube to contact and move the material through the tube to desired locations within a facility.

The usual cable conveyor includes an endless cable with discs attached at even intervals. The discs have a diameter slightly smaller than the diameter of the tube through which the cable travels, such that the discs slideably engage the interior wall of the tube. Discs have been formed of various materials including nylon and high molecular weight polyethylene.

Cable conveyors are used for numerous materials including industrial metal and plastic products, animal feed compositions, and human food items. When the conveyed material contains oil, a black-colored deposit may appear on the interior surface of the tubing.

As a consequence of the foregoing situation, there has existed a longstanding need for a new and improved cable conveyor disc and the provision of such a construction is a stated objective of the present invention.

BRIEF SUMMARY OF THE INVENTION

Briefly stated, the present invention provides a disc for a cable conveyor comprised of a polymer formed from a resin including a blend of siloxane, preferably high molecular weight siloxane, and polyethylene, preferably ultra-high molecular weight polyethylene. The siloxane has a viscosity ranging from 10,000 cst. to 1,000,000 cst., preferably about 500,000 cst., and the polyethylene has a molecular weight ranging from 3 million grams/mol. to 8 million grams/mol., preferably about 3.5 million grams/mol. The siloxane is present in the blend from 0.5 percent to 30.0, preferably about 3.0 percent.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein:

FIG. 3 is a sectional view further showing the relationship of the components.

DETAILED DESCRIPTION OF THE INVENTION

Figure 1:
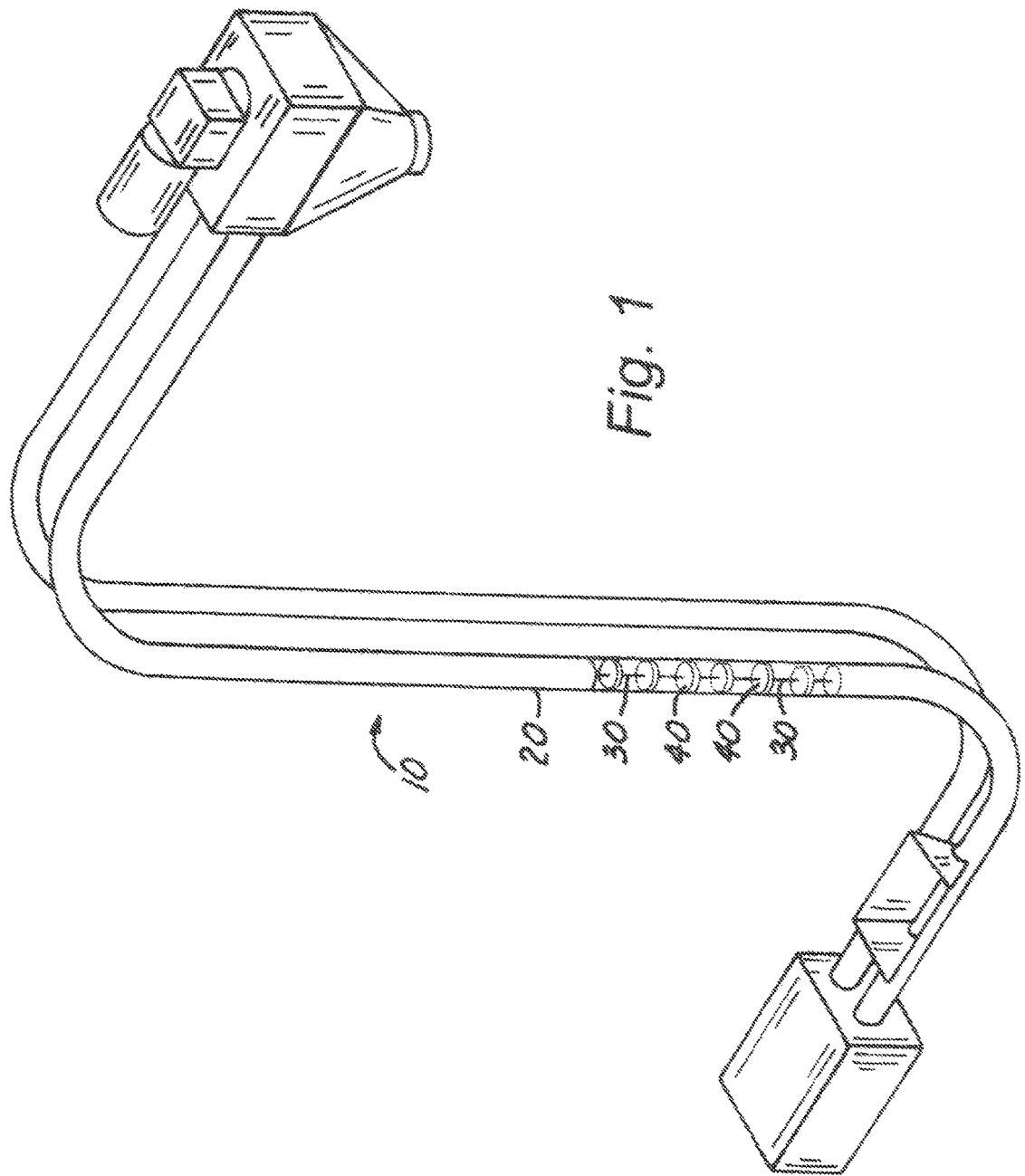
FIG. 1 is a perspective view illustrating a typical cable conveyor system using the polymer discs of the present invention.
Figure 2:
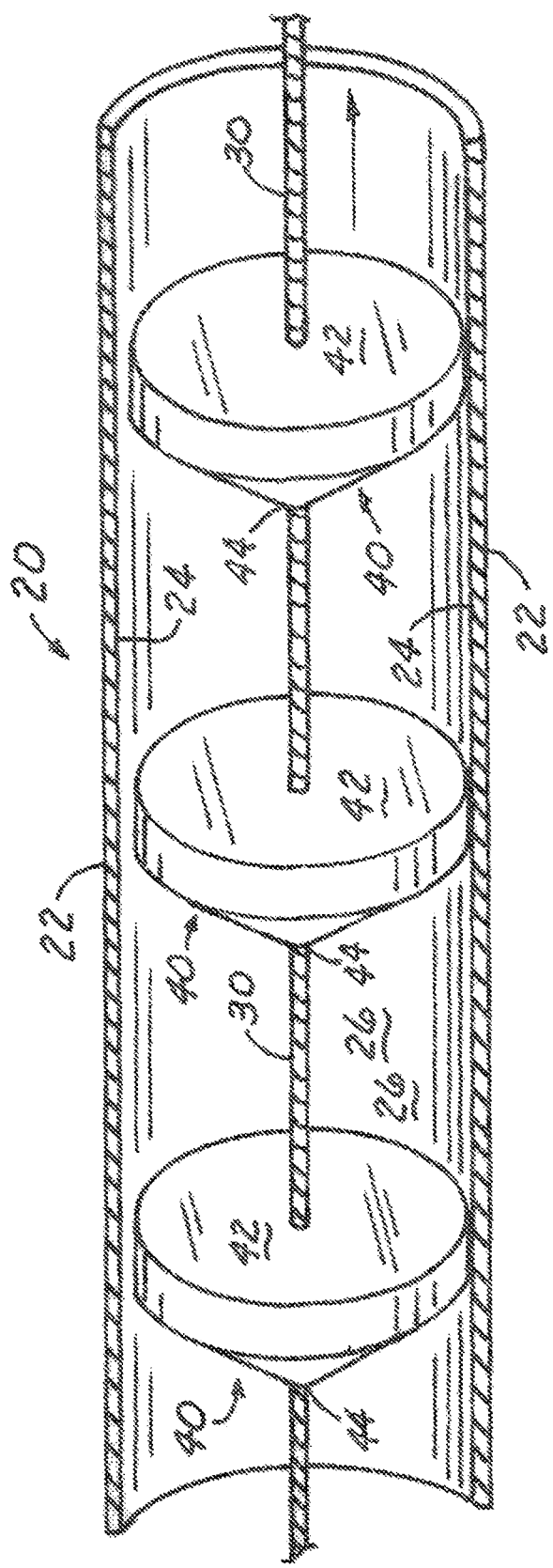
FIG. 2 is a partial perspective view with a portion cut away to show the relationship of the polymer discs to the cable and the tube.

As can be seen by reference to the drawings, and in particularly to FIG. 1, the cable conveyor system that forms the basis of the present invention is designated generally by the reference number 10. The conveyor system 10 includes a tube 20, a cable 30 that moves within the interior of the tube 20, and a number of discs 40 spaced at intervals along the cable 30.

The tube 20 has an exterior wall 22, an interior wall 24, and an interior cavity 26 through which the cable 30 travels.

The disc 40 of the present invention has a body member 42 having a central portion 44 attached to the cable 30, and a peripheral edge 46 that slideably engages the interior wall 24 of the tube 20.

The body member 42, and in particular the peripheral edge 46, is composed of a polymer that is formed from a resin that includes a blend of siloxane and polyethylene. The resin formulation is illustrated in the following Examples.

EXAMPLE I

The preferred embodiment of the present invention is a polymer disc 40 that was formed from a resin including the following:

| | |
|---|---|
| high molecular weight polydimethylsiloxane viscosity 500,000 cst. | 3.0 wt. % |
| ultra-high molecular weight polyethylene molecular weight 3.5 million grams/mol. when calculated using the Margolies' equation | 97.0 wt. % |

This resin was processed to form polymer discs 40 used in a cable conveyor system 10 having a stainless steel tube 20. The conveyor system was operated for several hours conveying material containing oil with no signs of a black deposit. When the same material was conveyed in a system 10 using regular discs formed of nylon or high molecular weight polyethylene, black deposits were observed after about 30 minutes.

EXAMPLE II

The polymer disc 40 may be formed from a resin including the following:

| | |
|---|---|
| high molecular weight/siloxane viscosity 100,000 cst. | 5.0 wt. % |
| ultra-high molecular weight polyethylene molecular weight 3.0 million grams/mol. when calculated using the Margolies' equation | 95.0 wt. % |

It is believed that this resin could be processed to form polyethylene discs 40 that could be used with results similar to Example I.

EXAMPLE III

The polymer disc 40 may be formed from a resin including the following:

| | |
|---|---|
| high molecular weight siloxane viscosity 60,000 cst. | 2.0 wt. % |
| ultra-high molecular weight polyethylene molecular weight 4.0 million grams/mol. when calculated using the Margolies' equation | 98.0 wt. % |

It is believed that this resin could be processed to form polyethylene discs 40 that could be used with results similar to Example I.

Example IV

The polymer disc 40 may be formed from a resin including the following:

| | |
|---|---|
| high molecular weight siloxane viscosity 10,000 cst. | 30.0 wt. % |
| ultra-high molecular weight polyethylene molecular weight 3.0 million grams/mol. when calculated using the Margolies' equation | 70.0 wt. % |

EXAMPLE V

The polymer disc 40 may be formed from a resin including the following:

| | |
|---|---|
| high molecular weight siloxane viscosity 1,000,000 cst. | 0.5 wt. % |
| ultra-high molecular weight polyethylene molecular weight 3.0 million grams/mol. when calculated using the Margolies' equation | 99.5 wt. % |

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

The invention claimed is:

1. A disc for attachment to a flexible member movable through a tube to convey material disposed within interior walls of the tube, the disc, comprising: a body member having a central portion attached to the flexible member and an outer peripheral edge disposed to move adjacent the interior wall of the tube; the peripheral edge of the body member being composed of a polymer formed from a resin including a blend of siloxane and polyethylene.

2. The disc of claim 1, wherein the resin includes a blend of a high molecular weight siloxane having a viscosity of from 10,000 cst. to 1,000,000 cst. and an ultra-high molecular weight polyethylene having a molecular weight of from 3 million grams/mol. to 8 million grams/mol., wherein the high molecular weight siloxane is present in the blend from 0.5 percent to 30.0 percent.

3. The disc of claim 2, wherein the resin includes a blend of high molecular weight siloxane having a viscosity of about 500,000 cst., and an ultra-high molecular weight polyethylene having a molecular weight of about 3.5 million grams/mol., wherein the high molecular weight siloxane is present at about 3.0 percent.

4. The disc of claim 1, wherein the body member is composed of the polymer.

5. The disc of claim 2, wherein the body member is composed of the polymer.

6. The disc of claim 3, wherein the body member is composed of the polymer.

\* \* \* \* \*